(12) United States Patent
Listou

(10) Patent No.: US 8,010,549 B2
(45) Date of Patent: *Aug. 30, 2011

(54) METHOD FOR AUTOMATIC SEQUENTIAL IMAGING OF SELECTED COMPUTER PRODUCED DIALOG BOXES WITH FIELDS FOR OPTIONAL ENTRY OF DATA TO AID VISUAL RETRIEVAL

(75) Inventor: Robert Eugene Listou, Washington, DC (US)

(73) Assignee: Execware, LLC, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/369,070

(22) Filed: Feb. 11, 2009

(65) Prior Publication Data

US 2010/0205185 A1 Aug. 12, 2010

(51) Int. Cl.
*G06F 17/30* (2006.01)
(52) U.S. Cl. .................. 707/761; 707/999.103; 715/236

(58) Field of Classification Search ................... 715/775, 715/779, 236; 703/760, 761, 999.103
See application file for complete search history.

(56) References Cited

U.S. PATENT DOCUMENTS

| | | | | | |
|---|---|---|---|---|---|
| 5,396,621 | A | * | 3/1995 | MacGregor et al. | 715/809 |
| 5,428,776 | A | * | 6/1995 | Rothfield | 1/1 |
| 5,566,330 | A | * | 10/1996 | Sheffield | 1/1 |
| 5,584,024 | A | * | 12/1996 | Shwartz | 1/1 |
| 5,619,688 | A | * | 4/1997 | Bosworth et al. | 1/1 |
| 6,826,727 | B1 | * | 11/2004 | Mohr et al. | 715/235 |
| 2006/0053388 | A1 | * | 3/2006 | Michelman | 715/775 |
| 2006/0053389 | A1 | * | 3/2006 | Michelman | 715/775 |
| 2009/0248184 | A1 | * | 10/2009 | Steingart et al. | 700/98 |

* cited by examiner

*Primary Examiner* — Jean M Corrielus

(57) ABSTRACT

Method for automatic imaging of a plurality of dialog boxes that create computer records of text data objects displayed on data tables, in order to visually discover meaningful interrelations of data on said dialog boxes. The dialog boxes contain parametric data, other data related to the text data object, and fields for entry of distinguishing text and/or color markings for reference during automated imaging of a plurality of dialog boxes.

2 Claims, 4 Drawing Sheets

METHOD FOR AUTOMATIC SEQUENTIAL IMAGING OF SELECTED COMPUTER PRODUCED DIALOG BOXES WITH FIELDS FOR OPTIONAL ENTRY OF DATA TO AID VISUAL RETRIEVAL

CROSS-REFERENCE TO RELATED APPLICATIONS AND PATENTS

U.S. Pat. No. 6,134,564
U.S. Pat. No. 6,216,139
application Ser. No. 08/561,178

BACKGROUND OF THE INVENTION

This application relates to cross-referenced application Ser. No. 08/562,178, filed Nov. 20, 1995, allowed as cross-referenced U.S. Pat. No. 6,216,139, and is amended to add and claim disclosure not presented in that prior application. Since the present application names the inventor named in the prior application, it may constitute a continuation-in-part of the prior application under the provisions of 35 U.S.C.120 and 37 CFR 1.78.

The invention in Claim 5 of cross-referenced application Ser. No. 08/562,178 is a dialog box for creating computer records of text data objects that are selectively displayed on data tables. The present invention adds two related functions to that dialog box. That dialog box is but one component of the several required for the mind-centric analytic methodology described in cross-referenced U.S. Pat. No. 6,134,564, all components of which are described herein as essential for a proper understanding of the present invention. That methodology, named contextual data modeling (CDM) by the present inventor, is a systemized form of computer-aided morphological analysis that deals with parametric objects in an orderly way in which no interrelations of their parameter values on a data table are ignored a priori as being unimportant. Said objects are any type of objects, events, or any other entities with unique identifying names or numbers, plus parameters such as weight, material, location, date, age, importance, etcetera. It will be apparent that such "evidence items" exist in many fields of investigation, analysis, and research and that many interrelations are possible. In CDM, the mind of the computer user, not the computer, discovers and analyzes all possible interrelations. Meaningful interrelations include groups, sequences, similarities, proximity, etcetera. Their merit is determined by the user in the context of that person's semantic, episodic, and procedural memory (knowledge, experience, and skills). The user's intuition, imagination, and reasoning then lead to iterative and rapid modeling/manipulating of the viewed data to synchronize it with the user's reasoning. The viewed data are displayed on the several computer-generated imaged CDM components, explained herein, that are, individually or severally, viewed by the user. Modeling continues until the user has identified and evaluated all possible meaningful groups, sequences, or other desired interrelations.

BRIEF SUMMARY OF THE INVENTION

The present invention is a means by which the computer user rapidly views, manually or automatically, a virtual stack of selected dialog boxes associated with tables of text data objects, in order to discover meaningful interrelations of observed data, and enters text and/or colors into visual reference fields on selected dialog boxes as distinguishing markers to assist retrieval during rapid sequencing of the virtual stack.

DETAILED DESCRIPTION OF THE INVENTION

Figure 1:
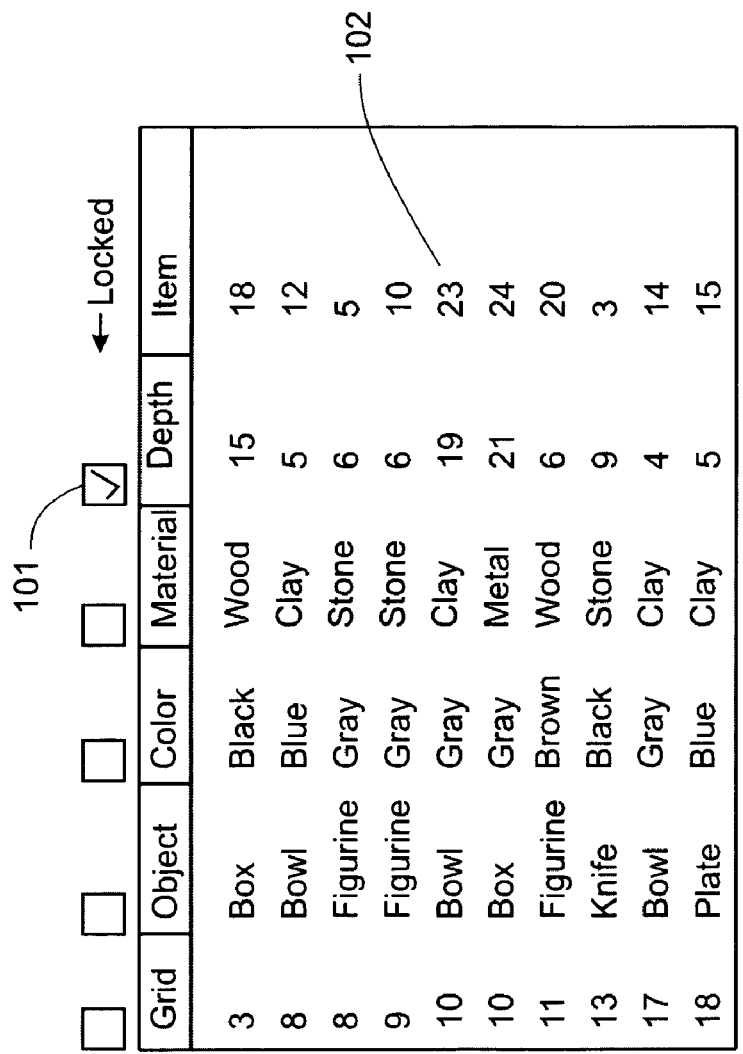
FIG. 1 depicts, for reference, a data table, per Cross-Referenced U.S. Pat. No. 6,216,139, with the names of listed text data objects in the last column, preceded by columns of four named parameters containing values assigned to the text data objects. Because different column arrangements, i.e. permutations, disclose different interrelations among parametric values, the user engaged in CDM views all possible permutations. The means for doing so rapidly, with automated permutation, are set forth in Cross-Referenced U.S. Pat. No. 6,134,564. Said user also views additional data by, for example, clicking the name of the text data object on the data table to cause the imaging of the dialog box that created the computer record that generated the text data object on the data table. Said dialog box is illustrated by FIG. 2.
Figure 2:
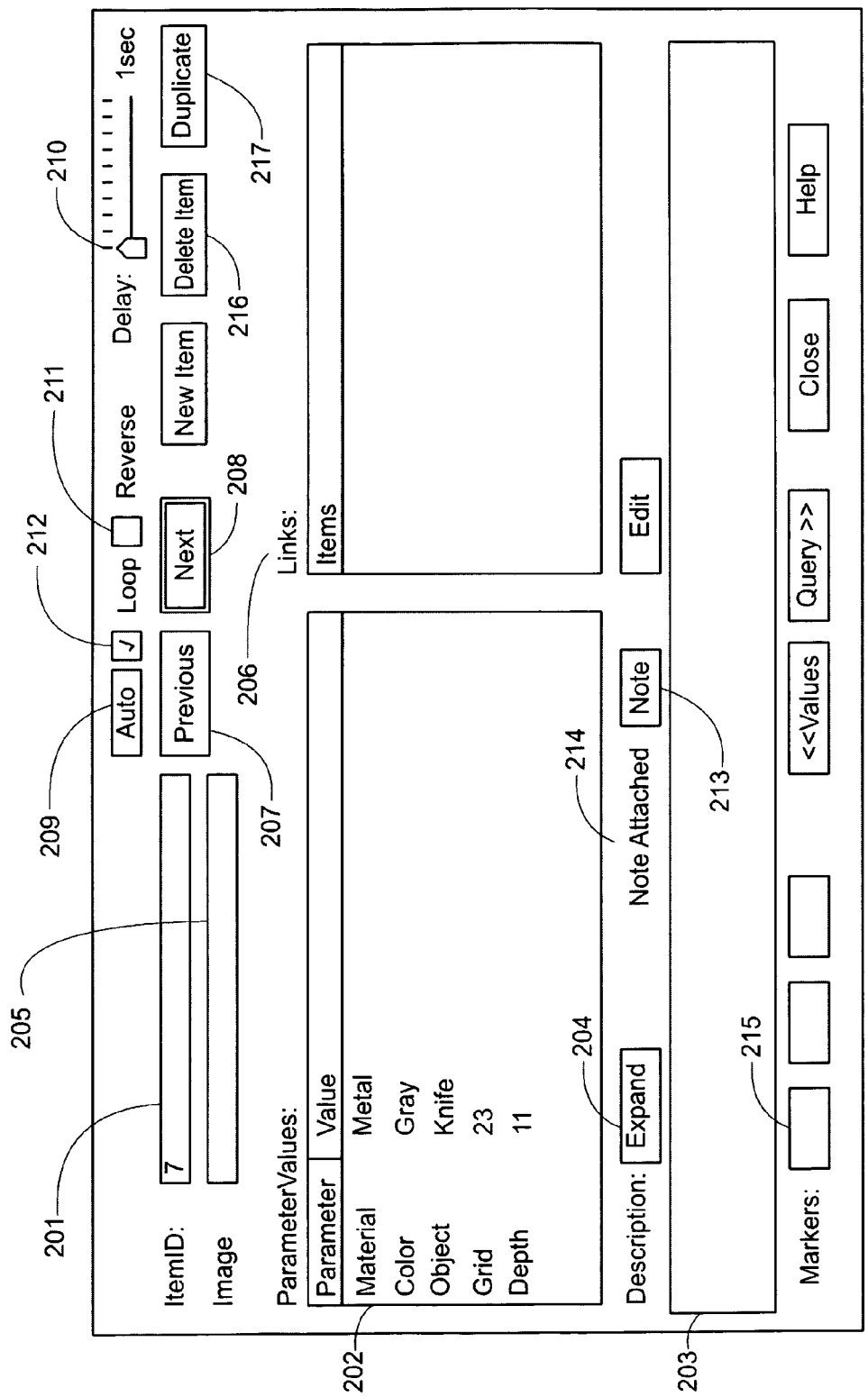
FIG. 2 is a dialog box, per Cross-Referenced U.S. Pat. No. 6,216,139, that is modified by the present invention. The dialog box selected by the user of an associated data table is the uppermost in a virtual stack of such dialog boxes for each of the data objects listed on the data table. The ordering of the dialog boxes in the stack is based on the ordering of the data objects listed on the data table. The user engaged in CDM optionally views all said dialog boxes, manually or automatically at a selected speed, downward or upward through the stack, with continuous looping if desired. The user's mind contemplates not only the parametric data but other data as depicted on FIG. 2.

The dialog box in FIG. 2, per Cross-Referenced U.S. Pat. No. 6,216,139, is used to generate the computer record of a text data object in the database from which is generated a data table, FIG. 1. The data in the record are the object name, parametric values, and links to other text data as indicated in FIG. 2. Such a dialog box is imaged when the user clicks the data object name (103) on the data table. The dialog box, FIG. 2, includes the object name (201), the object's parameters and their values (202), and a field for other relevant text (203), said field expandable by clicking (204). The expanded field provides space for a large quantity of text comprising much more data about the item than its name and parameter values on the data table, optionally including, for example, viewer comments entered during previous viewing. Another field (206) lists the names of other data objects on the data table that have been selected as related data objects, the similar dialog boxes of which can be accessed for reading by clicking their names in this field.

Consistent with the CDM concept of providing concurrent display of as much data as possible about the text data objects on the data table, the user is able to enter (205) the digital address of an associated file such as a letter, photograph, map, website, or audio file, etcetera. After entry of the digital address, clicking the word Image preceding the field at (205) opens the associated file, either directly or by displaying a "thumbnail" that accesses an application that in turn opens the file at that address. It will be apparent to those skilled in the art that other means of accessing the digital address at (205), such as clicking a link displayed on the associated data table, or by clicking the thumbnail or an adjacent name or number.

All the dialog boxes associated with the text data objects selected for the data table, FIG. 1, constitute a virtual stack of such dialog boxes. The present invention enables the user to rapidly, at a controlled speed, examine that stack of dialog boxes. The user views the data table and accesses the dialog box of an object listed on the table by clicking the name of that object on the table. The user then views sequentially all the other dialog boxes associated with objects on the data table by clicking the Previous (207) or Next (208) buttons, or by selecting automated sequencing by clicking Auto (209) and specifying the delay interval with the slider at (210). After the Auto mode (209) has been clicked, the word Auto on the button is automatically replaced by the word Stop, which can be clicked to stop the automated sequencing. For continuing perusal of the dialog boxes the user can also elect to see them in reverse order by clicking the box at (211), and can also cause the sequence to be displayed continuously by clicking Loop (212). The user optionally enters temporary notes on a field opened by clicking (213), and the presence of said note is indicated during sequential browsing by colored text (214) and a sound.

Prior to the present invention, the reasoning of the CDM user seeking to identify meaningful interrelations of data was about physical entities, namely pixels on a computer monitor, to identify meaningful interrelations of data on individual permutations of a data table, supplemented by additional data on associated dialog boxes. With the present invention, the user's reasoning is about mental entities, retained temporarily in memory after perception, of likely components of meaningful interrelations on a sequence of individual dialog boxes. Because of the short-term of data retention in human working memory, each of the dialog boxes comprising a virtual stack must be perceived rapidly, as is made possible with the present invention. Automatic sequencing, at a user controlled speed, frees the user's mind to focus on examination of data, with little attention to generating commands to the software. Using iterative sequencing, the user is able to mark individual dialog boxes selected as pertinent to the current reasoning, and then optionally delete other dialog boxes from the virtual stack.

The user can manipulate the content of the current virtual stack of dialog boxes by deleting (216) the current dialog box from the virtual; imaging a new dialog box to define and generate an additional data object (215) in the dataset; or creating a duplicate dialog box (217) when reasoning leads to the wish for a new one that is similar to the one being examined, said duplicate then being edited and renamed.

Figure 3:
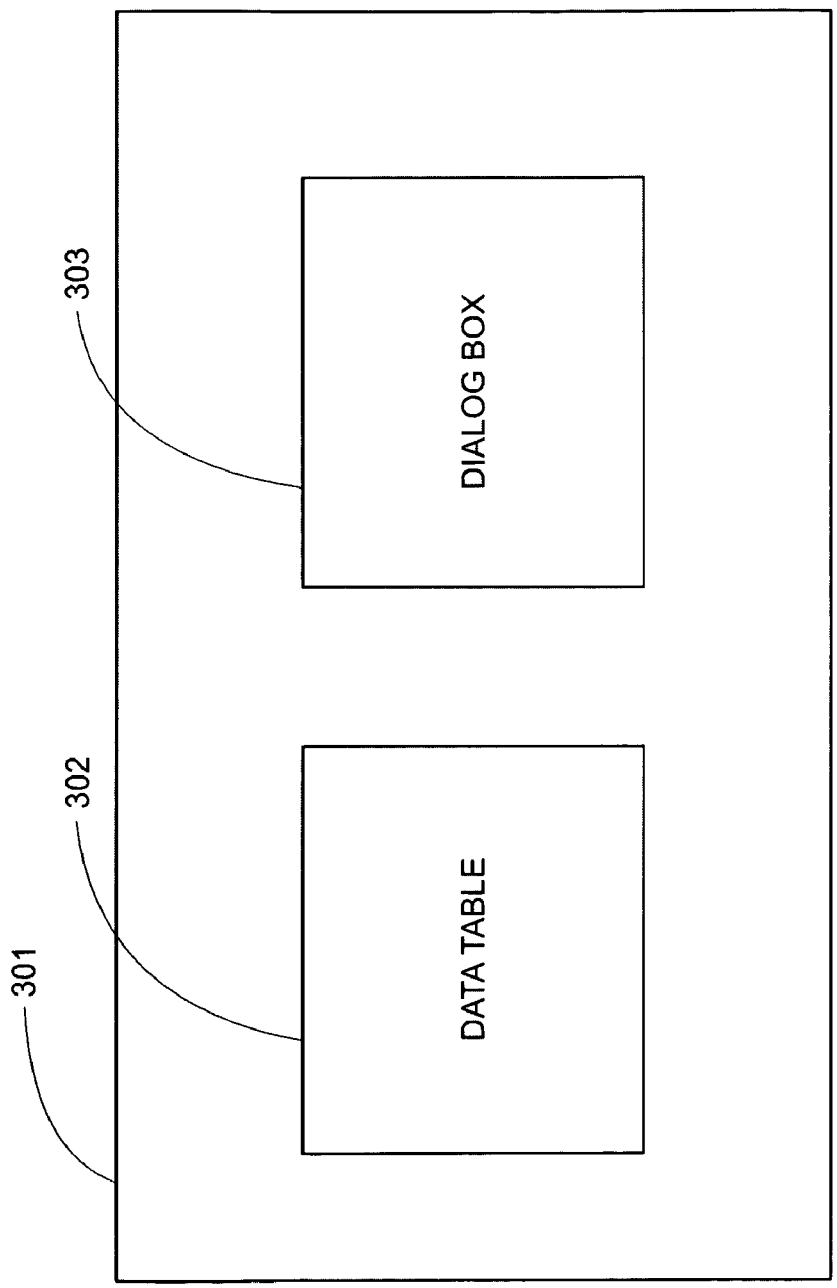
FIG. 3 depicts, for reference, the concurrent display of a data table and a dialog box associated with one of the items listed on the data table. Prior to the invention of the data table and dialog box per Cross-Referenced U.S. Pat. No. 6,216,139, a user viewing such a data table had no motivation to concurrently view the dialog box used to create the computer record of the text data items listed thereon. The concept of CDM calls for said concurrent viewing because although the dialog box displays more data about a text data object than does a data table, the data table most effectively discloses interrelations of parametric values and varying sequences of the names of data objects. The present invention provides to said dialog boxes the additional functionality of rapidly viewing a sequence of all the dialog boxes associated with objects on the data table while the data table is permuted. The user determines how the viewed data are manipulated to synchronize the display with the user's reasoning.

In support of immediacy in entering changes in recognition of the short-term of human working memory, clicking (218) opens a dialog box with a drop-down list of the current parameters and their values, enabling the user to edit the values. The user can also click (219) to image a query dialog box, per FIG. 3 in cross-referenced U.S. Pat. No. 6,216,139, in which were entered the desired select and sort criteria for the dataset to be analyzed. A data table is then generated as specified on the query dialog box.

Figure 4:
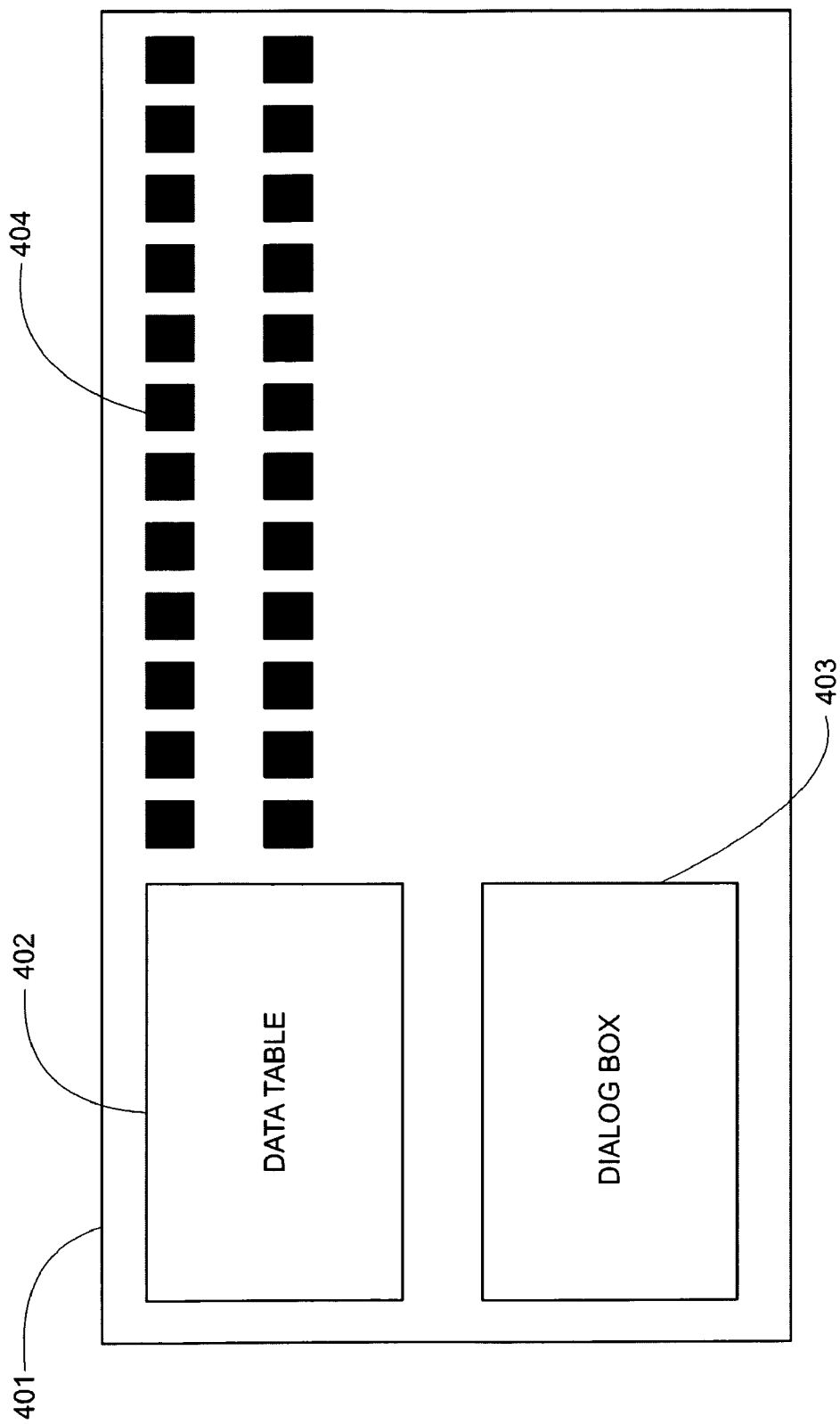
FIG. 4 depicts, for reference, optionally adding to the display in FIG. 3 the concurrent display, per U.S. Pat. No. 6,134,564, of images associated with the text data objects listed on the data table. Affording the user's field of vision more data than that on the data table and associated dialog boxes, the concurrent display of associated images, per U.S. Pat. No. 6,134,564, changes as the images shift position during automated permutation.

The CDM methodology calls for enabling the user to visually perceive concurrently a plurality of sources of data about the objects listed on a data table. Shown on a wide screen monitor (301) are both a data table (302) and an associated dialog box (303) opened by clicking an object name on the data table. It will be apparent that multiple physical locations of the two screens on the computer monitor, or monitors, can be chosen by the user. On FIG. 4 is a wide screen monitor displaying, in addition to the data table and dialog box, graphic images (404) displayed concurrently and coordinated with the location of the object names on the data table, per cross-referenced U.S. Pat. No. 6,134,564. A plurality of display options exist, such as multiple monitors, indexing thumbnails with text object names or numbers, even manipulating object images displayed when a thumbnail is clicked, if so enabled by the application generating the object image

What I claim as my inventions are:

1. A method for using a computer system to rapidly display a sequence of dialog boxes associated with selected text data objects listed on a data table, the method comprising:
   a. selecting from a database a set of text data objects, the parameter values of which are to be imaged on a data table displayed by a device controlled by the computer;
   b. designating the parameter value sort order for the imaging of the data objects on the data table;
   c. generating, in response to user commands, a series of images of the dialog boxes of data objects listed on the associated data table sorted according to the text data objects listed on the table, wherein the dialog boxes contain a plurality of fields displaying different data about the associated text data objects; and
   d. sequentially imaging the dialog boxes of data objects of said sorted data table based on the image options comprising:
   imaging option wherein imaging the sequence of dialog boxes is designated manual or automatic by the user,
   imaging option wherein the time intervals between the automatic sequential imaging of said dialog boxes is specified by the user,
   imaging option wherein the direction of sequencing is designated by the user, and
   imaging option wherein the direction sequencing is optionally continuous as designated by the user.

2. The method of claim 1 further comprising:
   e. imaging option wherein an optional entry of distinguishing text and/or colors in fields adjacent to a lower edge of the dialog box to assist in visual retrieval during sequencing of the dialog boxes.

\* \* \* \* \*